US010275704B2

(12) United States Patent
Rao et al.

(10) Patent No.: US 10,275,704 B2
(45) Date of Patent: Apr. 30, 2019

(54) GENERATING REPRESENTATIONS OF INPUT SEQUENCES USING NEURAL NETWORKS

(71) Applicant: Google LLC, Mountain View, CA (US)

(72) Inventors: Kanury Kanishka Rao, Sunnyvale, CA (US); Fuchun Peng, Cupertino, CA (US); Hasim Sak, New York, NY (US); Francoise Beaufays, Mountain View, CA (US)

(73) Assignee: Google LLC, Mountain View, CA (US)

( * ) Notice: Subject to any disclaimer, the term of this patent is extended or adjusted under 35 U.S.C. 154(b) by 655 days.

(21) Appl. No.: 14/728,875

(22) Filed: Jun. 2, 2015

(65) Prior Publication Data

US 2015/0356075 A1 Dec. 10, 2015

Related U.S. Application Data (60) Provisional application No. 62/008,687, filed on Jun. 6, 2014.

(51) Int. Cl.
*G06N 3/04* (2006.01)

(52) U.S. Cl.
CPC ............ *G06N 3/0445* (2013.01); *Y04S 10/54* (2013.01)

(58) Field of Classification Search
CPC ...... G06N 3/0445; G06N 3/08; G06N 3/0454; G06N 3/063; G06N 3/084; G06N 7/005; G10L 15/187; G10L 13/00; G10L 15/16; G10L 15/22
USPC .......................................................... 705/2
See application file for complete search history.

(56) References Cited

U.S. PATENT DOCUMENTS

| | | | |
|---|---|---|---|
| 9,263,036 B1 * | 2/2016 | Graves | G10L 15/16 |
| 2002/0049591 A1 * | 4/2002 | Hain | G10L 13/08 |
| | | | 704/243 |

OTHER PUBLICATIONS

Bahdanau et al., "Neural machine translation by jointly learning to align and translate," In arXiv preprint arXiv:1409.0473, Apr. 2015, pp. 1-15.

Cho et al., "Learning phrase representations using RNN encoder-decoder for statistical machine translation," In arXiv preprint arXiv:1406. 1078, Sep. 2014, 15 pages.

Graves and Schmidhuber, "Framewise Phoneme Classification with Bidirectional LSTM Networks," Neural Networks, Jul. 2005; 18(5-6):602-610.

(Continued)

*Primary Examiner* — Hiep V Nguyen
(74) *Attorney, Agent, or Firm* — Fish & Richardson P.C.

(57) ABSTRACT

Methods, systems, and apparatus, including computer programs encoded on computer storage media, for generating representations of input sequences. One of the methods includes receiving a grapheme sequence, the grapheme sequence comprising a plurality of graphemes arranged according to an input order; processing the sequence of graphemes using a long short-term memory (LSTM) neural network to generate an initial phoneme sequence from the grapheme sequence, the initial phoneme sequence comprising a plurality of phonemes arranged according to an output order; and generating a phoneme representation of the grapheme sequence from the initial phoneme sequence generated by the LSTM neural network, wherein generating the phoneme representation comprises removing, from the initial phoneme sequence, phonemes in one or more positions in the output order.

12 Claims, 4 Drawing Sheets

(56) References Cited

OTHER PUBLICATIONS

Graves et al., "Connectionist temporal classification: labelling unsegmented sequence data with recurrent neural networks," In Proceedings of the 23$^{rd}$ International Conference on Machine Learning, Jun. 2006, pp. 369-376.
Graves, "Generating sequences with recurrent neural networks," In arXiv preprint arXiv:1308.0850, Jun. 2014, pp. 1-43.
Graves, "Supervised Sequence Labelling with Recurrent Neural Networks," Dissertation, Technische Universitat Miinchen, Miinchen, 2008, available at http://www.cs.toronto.edu/~graves/phd.pdf, 124 pages.
Kalchbrenner and Blunsom, "Recurrent continuous translation models," In Proceedings of the 2013 Conference on Empirical Methods in Natural Language Processing, Oct. 2013, 10 pages.
Novak et al., "WFST-based Grapheme-to-Phoneme Conversion: Open Source Tools for Alignment, Model-Building and Decoding," Proceedings of the 10th International Workshop on Finite State Methods and Natural Language Processing, pp. 45-49, Jul. 2012.

\* cited by examiner

GENERATING REPRESENTATIONS OF INPUT SEQUENCES USING NEURAL NETWORKS

CROSS-REFERENCE TO RELATED APPLICATION

This application claims priority to U.S. Provisional Application No. 62/008,687, filed on Jun. 6, 2014. The disclosure of the prior application is considered part of and is incorporated by reference in the disclosure of this application.

BACKGROUND

This specification relates to generating representations of input sequences.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into an output sequence of phonemes.

SUMMARY

In general, one innovative aspect of the subject matter described in this specification can be embodied in methods that include the actions of receiving a grapheme sequence, the grapheme sequence comprising a plurality of graphemes arranged according to an input order; processing the sequence of graphemes using a long short-term memory (LSTM) neural network to generate an initial phoneme sequence from the grapheme sequence, the initial phoneme sequence comprising a plurality of phonemes arranged according to an output order; and generating a phoneme representation of the grapheme sequence from the initial phoneme sequence generated by the LSTM neural network, wherein generating the phoneme representation comprises removing, from the initial phoneme sequence, phonemes in one or more positions in the output order. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The phonemes in the phoneme representation may not be aligned to graphemes in the grapheme sequence. The LSTM neural network may be configured to generate, from each received grapheme sequence, an output sequence that includes one or more vocabulary phonemes and one or more blank phonemes, wherein each vocabulary phoneme is selected by the LSTM neural network from a vocabulary of possible phoneme representations of graphemes, and wherein the blank phonemes are not included in the vocabulary of phonemes. Removing the phonemes in one or more positions in the output order can include removing from the initial phoneme sequence each blank phoneme that precedes all of the vocabulary phonemes in the output order. The actions can further include: receiving training data for the LSTM neural network, the training data comprising a plurality of training grapheme sequences and, for each training grapheme sequence, a corresponding training phoneme sequence; modifying the training data by modifying each training phoneme sequence by adding a blank phoneme to one or more earliest positions in the output order for the training phoneme sequence; and configuring the LSTM neural network to generate output sequences that include one or more vocabulary phonemes and one or more blank phonemes by training the LSTM neural network on the modified training data. Adding a blank phoneme to one or more earliest positions in the output order can include adding the blank phoneme to each of a predetermined number of earliest positions in the output order in the training phoneme sequence. Adding a blank phoneme to one or more earliest positions in the output order can include adding the blank phoneme to each of a first number of earliest positions in the output order in the training phoneme sequence, and wherein the first number is proportional to a number of graphemes in the training grapheme sequence corresponding to the training phoneme sequence.

In general, another innovative aspect of the subject matter described in this specification can be embodied in methods that include the actions of receiving an input sequence comprising a plurality of inputs arranged according to an input order; processing the input sequence using a long short-term memory (LSTM) neural network to generate an initial output sequence for the input sequence, the initial output sequence for the input sequence comprising a plurality of outputs arranged according to an output order; and generating a final representation of the input sequence from the initial output sequence generated by the LSTM neural network, wherein generating the final output sequence comprises removing, from the initial output sequence, outputs in one or more positions in the output order. Other embodiments of this aspect include corresponding computer systems, apparatus, and computer programs recorded on one or more computer storage devices, each configured to perform the actions of the methods.

Particular embodiments of the subject matter described in this specification can be implemented so as to realize one or more of the following advantages. An output sequence that is a representation of an input sequence in a different form can be accurately predicted. For example, a grapheme to phoneme system can accurately predict the sequence of phonemes that represents a received grapheme sequence. As another example, a machine translation system can accurately predict the translation for a received sequence of words. An output sequence can be predicted from an input sequence without constraining the system to align the outputs in the output sequence with inputs from the input sequence.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
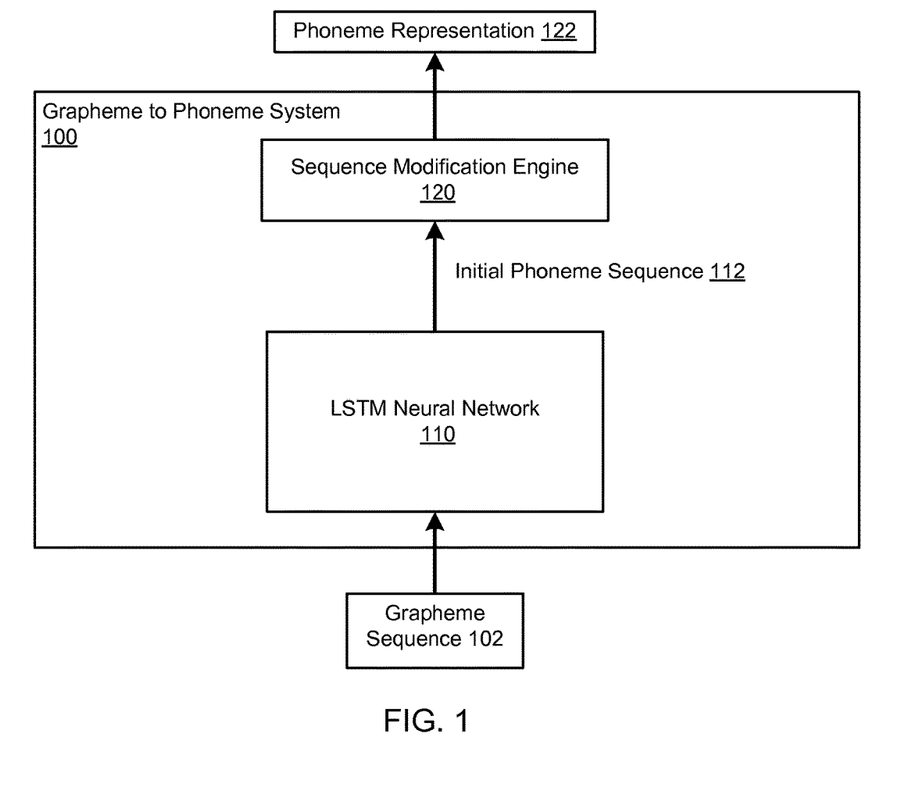
FIG. 1 shows an example grapheme to phoneme system.

FIG. 1 shows an example grapheme to phoneme system 100. The grapheme to phoneme system 100 is an example of a system implemented as computer programs on one or more computers in one or more locations, in which the systems, components, and techniques described below can be implemented.

The grapheme to phoneme system 100 receives grapheme sequences and generates phoneme representations for the grapheme sequences. For example, the grapheme to phoneme system 100 can receive a phoneme sequence 102 and generate a phoneme representation 122 for the grapheme sequence 102. The phoneme representation 122 for the grapheme sequence 102 is an ordered sequence of phonemes that the grapheme to phone system 100 has classified as representing the grapheme sequence. For example, if the grapheme sequence 102 is {g, o, o, g, l, e}, the phoneme representation 122 generated by the grapheme to phoneme system 100 may be {g, uh, g, ax, l}.

The grapheme to phoneme system 100 includes a long short-term memory (LSTM) neural network 110 and a sequence modification engine 120. The LSTM neural network 110 is a recurrent neural network that receives an input sequence, e.g., the grapheme sequence 102, and generates an initial output sequence, e.g., an initial phoneme sequence 112, from the input sequence. The LSTM neural network 110 can include one or more LSTM memory blocks. Each LSTM memory block can include one or more cells that each include an input gate, a forget gate, and an output gate that allow the cell to store previous activations generated by the cell, e.g., for use in generating a current activation or to be provided to other components of the LSTM neural network 110. An example LSTM neural network is described in more detail in "Supervised Sequence Labelling with Recurrent Neural Networks," Alex Graves, Dissertation, Technische Universität München, München, 2008, available at http://www.cs.toronto.edu/~graves/phd.pdf.

The LSTM neural network 110 has been configured, e.g., through training, to select, for each position in the initial output sequence, either a phoneme from a vocabulary of phonemes or a blank phoneme. The vocabulary of phonemes includes phonemes that have been provided to the grapheme to the phoneme system 100 as possible representations for input graphemes. The blank phoneme is a phoneme that is not included in the vocabulary. Thus, if the grapheme sequence 102 received by the LSTM neural network 110 is {g, o, o, g, l, e}, the initial phoneme sequence 112 generated by the LSTM neural network 110 may be {φ, φ, g, uh, g, ax, l}, where "g," "uh" "g," "ax," and "l" are phonemes from the vocabulary of phonemes and "φ" is a blank phoneme not in the vocabulary of phonemes. Configuring the LSTM neural network 110 to select from the vocabulary of phonemes and the blank phoneme by training the LSTM neural network 110 on training data is described in more detail below with reference to FIG. 3. Additionally, the LSTM neural network 110 generates the initial output sequences without aligning outputs in the initial output sequences with inputs in the received input sequences. For example, the LSTM neural network 110 can generate the sequence {φ, φ, g, uh, g, ax, l} from the sequence {g, o, o, g, l, e} without aligning "g," "uh" "g," "ax," and "l" with any specific grapheme in {g, o, o, g, l, e}.

The sequence modification engine 120 receives the initial output sequences, e.g., the initial phoneme sequence 112, generated by the LSTM neural network 110, and generates a phoneme representation for the grapheme sequence received by the LSTM neural network, e.g., the phoneme representation 122 for the grapheme sequence 102, from the initial output sequence. In particular, the sequence modification engine 120 generates the phoneme representation by removing the blank phonemes from the initial output sequence generated by the LSTM neural network 110. Thus, if the initial phoneme sequence 112 is {φ, φ, g, uh, g, ax, l}, the sequence modification engine 120 generates the phoneme representation {g, uh, g, ax, l} by removing the blank phonemes "φ" from the initial phoneme sequence.

While FIG. 1 describes the input sequences as being sequences of graphemes and the final representations generated for the input sequences as being sequences of phonemes, the system 100, when appropriately configured, can be used to generate final representations for different kinds of input sequences. That is, the input sequences may be ordered sequences of a different kind of input and the final representations may be ordered sequences of outputs that represent the input sequence in a different form. For example, the input sequences may be sequences of words in one language and the final representations for the input sequences may be sequences of words in another language that the system 100 has classified as being translations of the input sequences.

Figure 2:
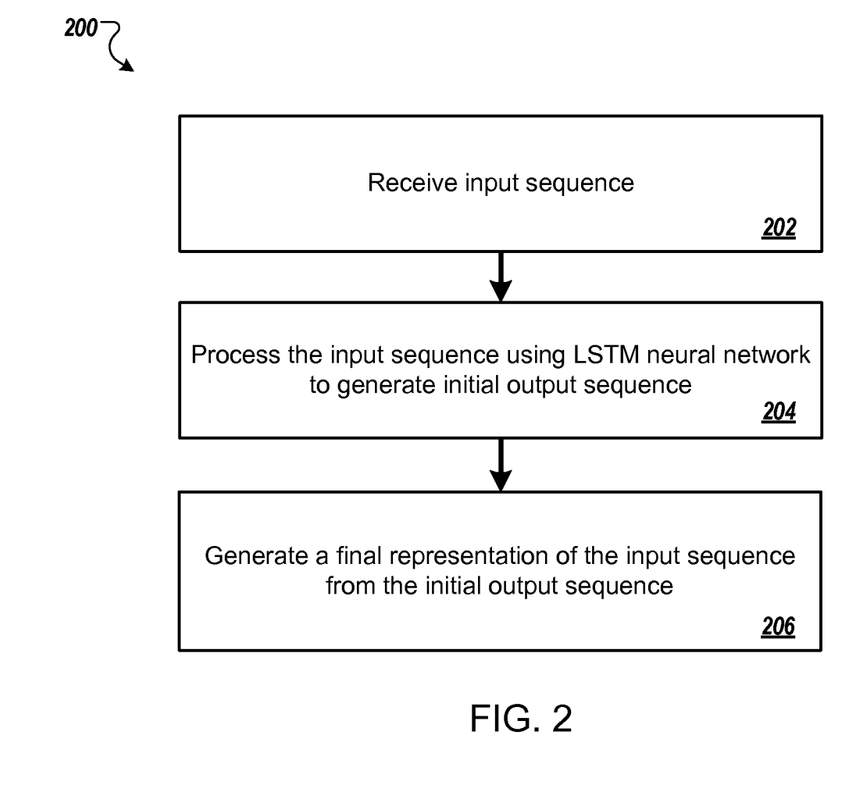
FIG. 2 is a flow diagram of generating a final representation of an input sequence.

FIG. 2 is a flow diagram of an example process 200 for generating a final representation of an input sequence. For convenience, the process 200 will be described as being performed by a system of one or more computers located in one or more locations. For example, a grapheme to phoneme system, e.g., the grapheme to phoneme system 100 of FIG. 1, appropriately programmed, can perform the process 200.

The system receives an input sequence (step 202). The input sequence includes a set of inputs arranged according to an input order. For example, the input sequence may be a sequence of graphemes to be converted into a corresponding sequence of phonemes or a sequence of words in one language to be translated into a sequence of words in a different language.

The system processes the input sequence using an LSTM neural network, e.g., the LSTM neural network 110 of FIG. 1, to generate an initial output sequence (step 204). The LSTM neural network receives the input sequence and generates an initial output sequence from the input sequence in accordance with current values of a set of parameters of the neural network. The initial output sequence includes a set of outputs arranged according to an output order. As will be described below with reference to FIG. 3, the LSTM neural network has been configured, e.g., by training the LSTM neural network on training data, to select, for each position in the initial output sequence, either an output from a vocabulary of outputs or a blank output. The outputs in the vocabulary of outputs are outputs that have been provided to the system as being possible representations of inputs received by the system.

The system generates a final representation of the input sequence from the initial output sequence (step 206). In particular, due to the configuration of the LSTM neural network, the initial output sequence generated by the LSTM neural network will generally have one or more blank outputs at one or more earliest positions in the output order.

The system generates the final representation by removing the blank outputs from the initial output sequence. Thus, the final representation is a sequence that includes only outputs form the vocabulary of outputs.

The process 200 can be performed to predict a final representation for an input sequence for which the desired final representation is not known, e.g., for a received grapheme sequence for which the received phoneme sequence is not known or for a received sequence of words for which the correct translation is not known, and after trained values of the parameters of the LSTM neural network have already been determined. In order to determine the trained values of the parameters of the LSTM neural network, the LSTM neural network can be trained on a set of training data.

Figure 3:
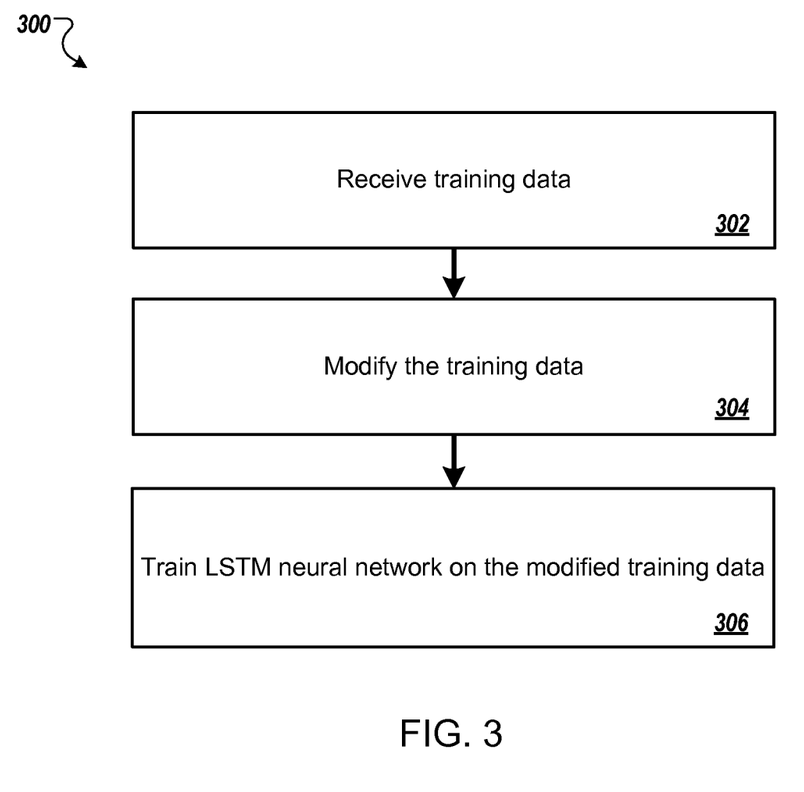
FIG. 3 is a flow diagram of an example process for training an LSTM neural network.

FIG. 3 is a flow diagram of an example process 300 for training an LSTM neural network. For convenience, the process 300 will be described as being performed by a system of one or more computers located in one or more locations. For example, a grapheme to phoneme system, e.g., the grapheme to phoneme system 100 of FIG. 1, appropriately programmed, can perform the process 300.

The system receives training data for an LSTM neural network, e.g., the LSTM neural network 110 of FIG. 1 (step 302). The training data includes a set of training input sequences, and for each input sequence, a corresponding training output sequence. Each training input sequence includes inputs arranged according to an input order and each training output sequence includes outputs arranged according to an output order. Generally, the training output sequence for a given training input sequence is a representation of the input sequence in a different form. For example, if the input sequences are sequences of words in one language that are to be translated into another language, the training output sequence is the known translation of the input sequence into the other language. As another example, if the input sequences are sequences of graphemes, the training output sequence is the known phoneme representation of the input sequence.

The system modifies the training data to generate modified training data for the LSTM neural network (step 302). In particular, the system modifies the training output sequences in the training data by adding blank outputs, i.e., outputs not included in a vocabulary of possible outputs, at one or more earliest positions in the output order of the input sequence. In some implementations, the system inserts a blank output at a predetermined number of earliest positions in each training output sequence. For example, for each training output sequence, the system may insert a blank output at the earliest position, the two earliest positions, or the three earliest positions in each training output sequence. In some other implementations, for each training output sequence, the system determines the number of blank outputs to insert based on the number of inputs in the corresponding training input sequence. That is, the system inserts blank outputs at a number of positions in the order that is proportional to the number of inputs in the corresponding training input sequence, e.g., half of the number of inputs in the corresponding training input sequence or equal to the number of inputs in the corresponding training input sequence. In these implementations, the system also optionally modifies the corresponding training input sequence to insert an end of sentence input at the end of the input sequence to allow the LSTM to recognize when the input sequence has ended.

The system trains the LSTM neural network on the modified training data (step 304). That is, the system can perform multiple iterations of a conventional LSTM training technique to obtain trained values of parameters of the LSTM neural network. By training the LSTM neural network on the modified training data, the LSTM neural network will be configured to delay generating outputs from the vocabulary of possible outputs until the network has processed a certain number of inputs from the input sequence, i.e., until a certain number of previous activations are stored by each LSTM cell in the LSTM neural network. Additionally, the LSTM neural network can generate the output sequence without aligning outputs in the output sequence with specific inputs from the input sequence.

Figure 4:
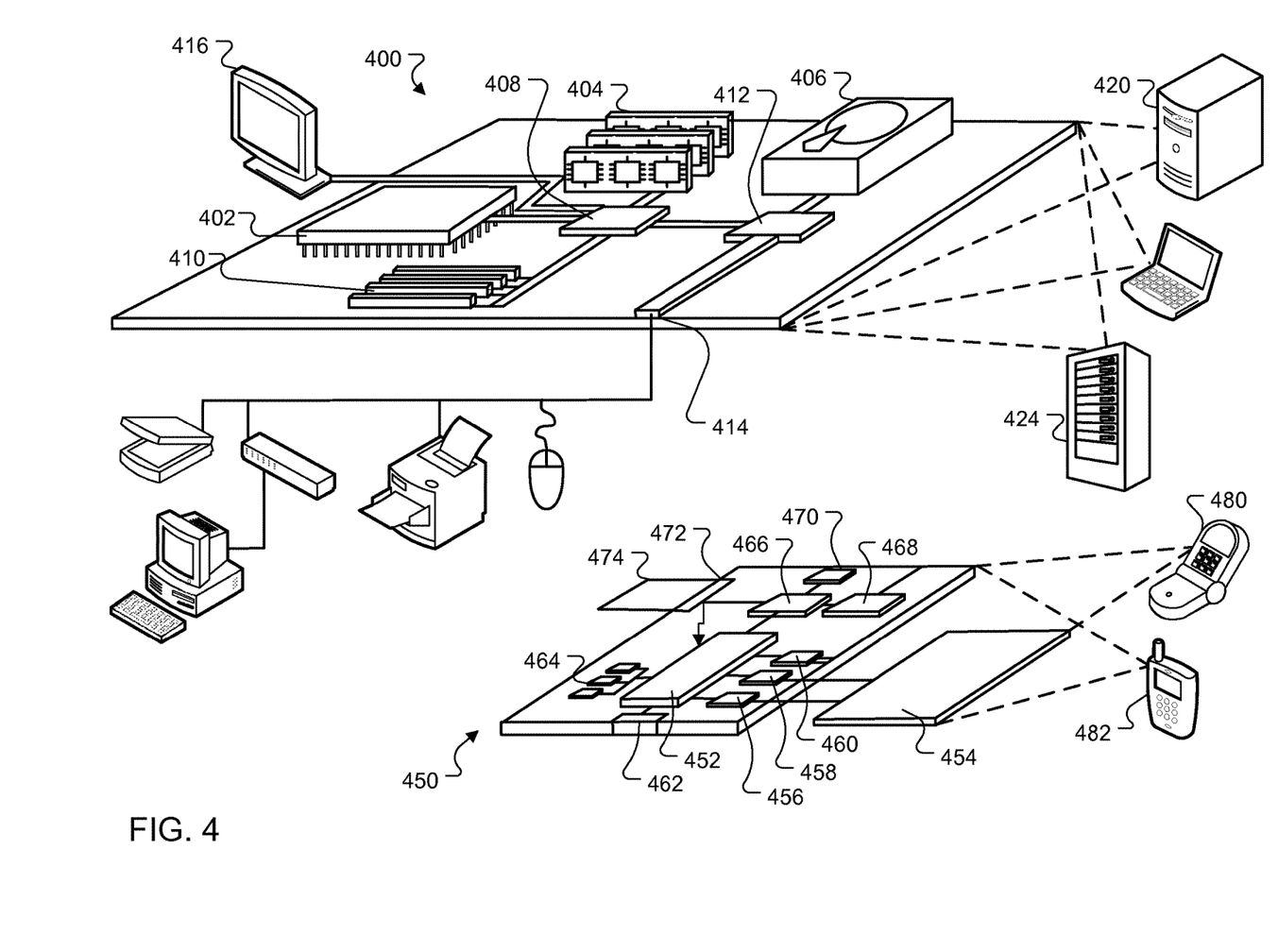
FIG. 4 is diagram of exemplary computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving training data for training a long short-term memory (LSTM) neural network, the training data comprising a plurality of training input sequences and, for each training input sequence, a corresponding training output sequence that includes one or more vocabulary outputs from a vocabulary of possible outputs arranged according to an output order;
modifying the training data by modifying each training output sequence by adding a blank output to one or more earliest positions in the output order for the training output sequence, wherein the blank output is not included in the vocabulary of possible outputs;
configuring the LSTM neural network to generate output sequences that include one or more vocabulary outputs and one or more blank outputs by training the LSTM neural network on the modified training data;
after the LSTM neural network has been trained:
receiving an input sequence for the LSTM neural network, the input sequence comprising a plurality of inputs arranged according to an input order;
processing the input sequence using the LSTM neural network to generate an initial output sequence for the input sequence, the initial output sequence for the input sequence comprising a plurality of outputs arranged according to an output order; and
generating a final output sequence for the input sequence from the initial output sequence generated by the LSTM neural network, wherein generating the final output sequence comprises removing, from the initial output sequence, blank outputs in one or more positions in the output order, wherein removing the blank outputs in one or more positions in the output order comprises removing, from the initial output sequence, each blank output that precedes all of the vocabulary outputs in the output order.

2. The method of claim 1, wherein the individual inputs in each of the training input sequences are not aligned to individual outputs of corresponding modified training output sequences.

3. The method of claim 1, wherein adding a blank output to one or more earliest positions in the output order comprises adding the blank output to each of a predetermined number of earliest positions in the output order in the training output sequence.

4. The method of claim 1, wherein adding a blank output to one or more earliest positions in the output order comprises adding the blank output to each of a first number of earliest positions in the output order in the training output sequence, and wherein the first number is proportional to a number of inputs in the training input sequence corresponding to the training output sequence.

5. A method comprising:
receiving training data for training a long short-term memory (LSTM) neural network, the training data comprising a plurality of training grapheme sequences and, for each training grapheme sequence, a corresponding training phoneme sequence that includes one or more vocabulary phonemes from a vocabulary of possible phonemes arranged according to an output order;
modifying the training data by modifying each training phoneme sequence by adding a blank phoneme to one or more earliest positions in the output order for the training phoneme sequence, wherein the blank output is not included in the vocabulary of possible outputs;
configuring the LSTM neural network to generate output sequences that include one or more vocabulary phonemes and one or more blank phonemes by training the LSTM neural network on the modified training data;
after the LSTM neural network has been trained:
receiving a grapheme sequence for the LSTM neural network, the grapheme sequence comprising a plurality of graphemes arranged according to an input order;
processing the grapheme sequence using the LSTM neural network to generate an initial phoneme sequence from the grapheme sequence, the initial phoneme sequence comprising a plurality of phonemes arranged according to an output order; and
generating a phoneme representation of the grapheme sequence from the initial phoneme sequence generated by the LSTM neural network, wherein generating the phoneme representation comprises removing, from the initial phoneme sequence, blank phonemes in one or more positions in the output order, wherein removing the blank phonemes in one or more positions in the output order comprises removing, from the initial phoneme sequence, each blank phoneme that precedes all of the vocabulary phonemes in the output order.

6. The method of claim 5, wherein adding a blank phoneme to one or more earliest positions in the output order comprises adding the blank phoneme to each of a predetermined number of earliest positions in the output order in the training phoneme sequence.

7. The method of claim 5, wherein adding a blank phoneme to one or more earliest positions in the output order comprises adding the blank phoneme to each of a first number of earliest positions in the output order in the training phoneme sequence, and wherein the first number is proportional to a number of graphemes in the training grapheme sequence corresponding to the training phoneme sequence.

8. A system comprising one or more computers and one or more storage devices storing instructions that when executed by the one or more computers cause the one or more computers to perform operations comprising:
receiving training data for training a long short-term memory (LSTM) neural network, the training data comprising a plurality of training grapheme sequences and, for each training grapheme sequence, a corresponding training phoneme sequence that includes one or more vocabulary phonemes from a vocabulary of possible phonemes arranged according to an output order;
modifying the training data by modifying each training phoneme sequence by adding a blank phoneme to one or more earliest positions in the output order for the training phoneme sequence, wherein the blank output is not included in the vocabulary of possible outputs;
configuring the LSTM neural network to generate output sequences that include one or more vocabulary phonemes and one or more blank phonemes by training the LSTM neural network on the modified training data;
after the LSTM neural network has been trained:
receiving a grapheme sequence for the LSTM neural network, the grapheme sequence comprising a plurality of graphemes arranged according to an input order;
processing the grapheme sequence using the LSTM neural network to generate an initial phoneme sequence from the grapheme sequence, the initial phoneme sequence comprising a plurality of phonemes arranged according to an output order; and
generating a phoneme representation of the grapheme sequence from the initial phoneme sequence generated by the LSTM neural network, wherein generating the phoneme representation comprises removing, from the initial phoneme sequence, blank phonemes in one or more positions in the output order, wherein removing the blank phonemes in one or more positions in the output order comprises removing from the initial phoneme sequence each blank phoneme that precedes all of the vocabulary phonemes in the output order.

9. The system of claim 8, wherein adding a blank phoneme to one or more earliest positions in the output order comprises adding the blank phoneme to each of a predetermined number of earliest positions in the output order in the training phoneme sequence.

10. The system of claim 8, wherein adding a blank phoneme to one or more earliest positions in the output order comprises adding the blank phoneme to each of a first number of earliest positions in the output order in the training phoneme sequence, and wherein the first number is proportional to a number of graphemes in the training grapheme sequence corresponding to the training phoneme sequence.

11. The method of claim 8, wherein the individual graphemes in each training grapheme sequence are not aligned to individual phonemes of corresponding modified training phoneme sequences.

12. The method of claim 5, wherein the individual graphemes in each training grapheme sequence are not aligned to individual phonemes of corresponding modified training phoneme sequences.

* * * * *

UNITED STATES PATENT AND TRADEMARK OFFICE
CERTIFICATE OF CORRECTION

| | |
|---|---|
| PATENT NO. | : 10,275,704 B2 |
| APPLICATION NO. | : 14/728875 |
| DATED | : April 30, 2019 |
| INVENTOR(S) | : Kanury Kanishka Rao et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this
Twenty-sixth Day of May, 2020

Andrei Iancu
*Director of the United States Patent and Trademark Office*